Figure 1:
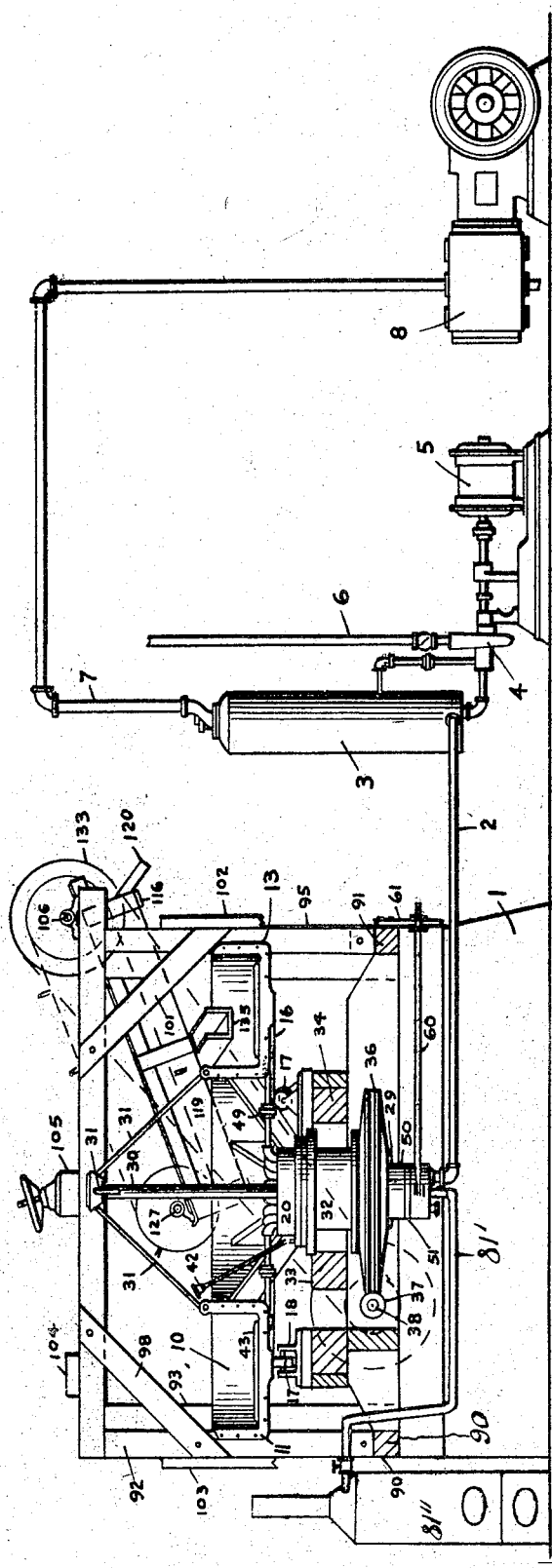

E. L. OLIVER.
ROTARY FILTER TABLE.
APPLICATION FILED MAY 28, 1918.

1,335,695.

Patented Mar. 30, 1920.
4 SHEETS—SHEET 3.

INVENTOR.
E. L. OLIVER
BY
Carlos P. Griffin
ATTORNEY.

E. L. OLIVER.
ROTARY FILTER TABLE.
APPLICATION FILED MAY 28, 1918.
1,335,695.
Patented Mar. 30, 1920.
4 SHEETS—SHEET 4.
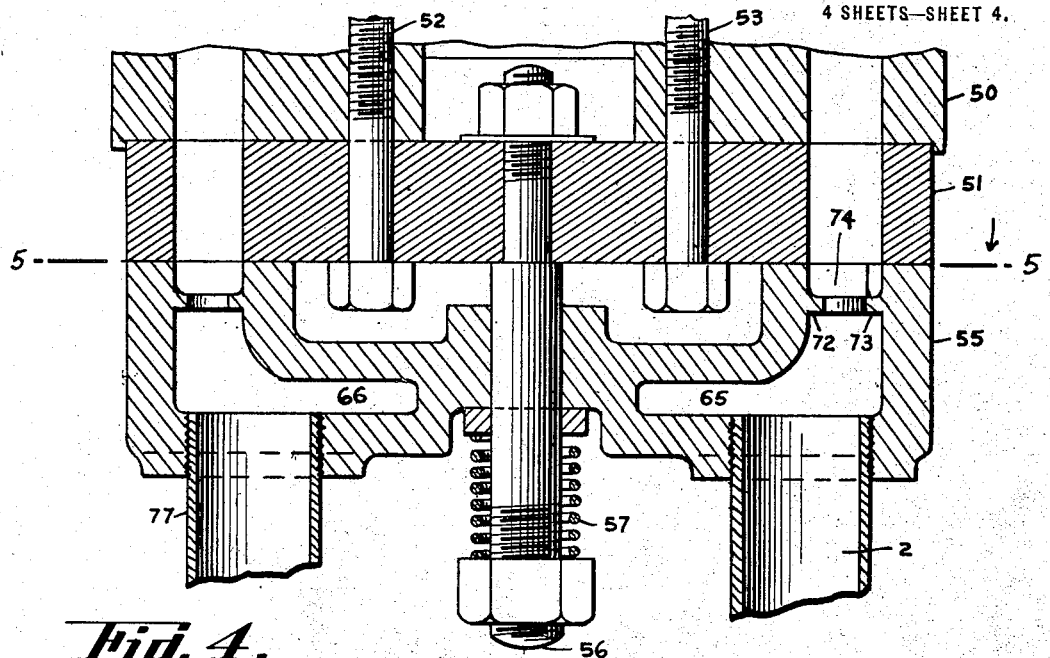
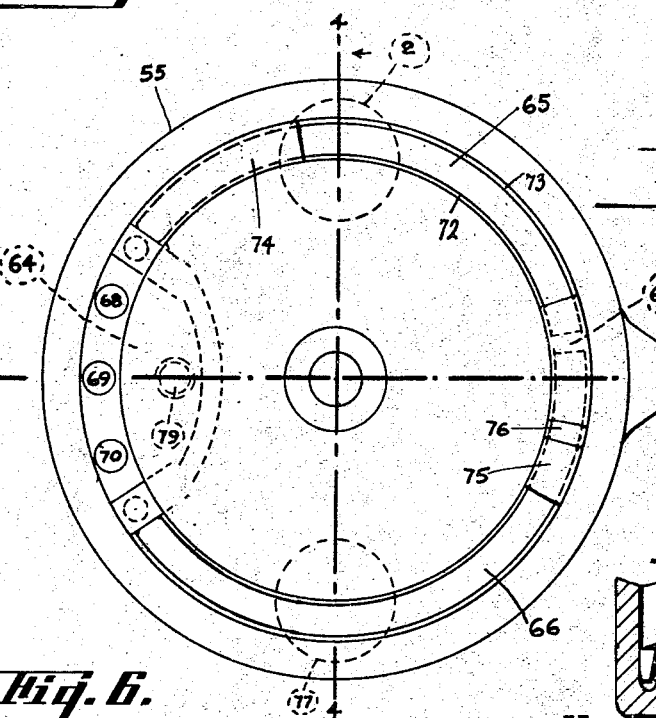
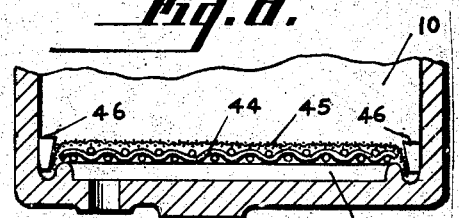
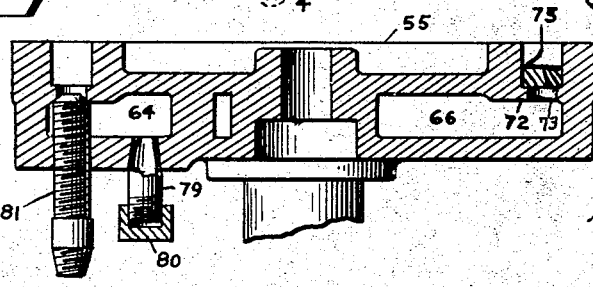
INVENTOR.
E. L. OLIVER
BY
Carlos P. Griffin
ATTORNEY.

UNITED STATES PATENT OFFICE.

EDWIN LETTS OLIVER, OF OAKLAND, CALIFORNIA.

ROTARY FILTER-TABLE.

1,335,695.  Specification of Letters Patent.  Patented Mar. 30, 1920.

Application filed May 28, 1918. Serial No. 237,081.

*To all whom it may concern:*

Be it known that I, EDWIN LETTS OLIVER, a citizen of the United States, residing at Oakland, in the county of Alameda, State of California, have invented a new and useful Rotary Filter-Table, of which the following is a specification in such full and clear terms as will enable those skilled in the art to construct and use the same.

This invention relates to a rotary table filter, and its object is to produce a filter which is capable of removing the liquid from the solids in one or two stages as may be desired, and thereafter flushing the filter with a solution from below or blowing air through the filter to loosen the material collected upon the filtering medium.

Another object of the invention is to provide a filter which can be readily cleaned as the sands accumulate thereon, a suitable conveyer being used to remove the sand and discharge it in a suitable place.

Another object of the invention is to provide means whereby the water or filtrate removed from the substance being filtered may be removed from the pipes in which it is collected without passing through the vacuum pump, a special pump being used to remove the filtrate from the water receiver.

Another object of the invention is to provide means whereby the position of the automatic valve controlling the vacuum and blowing apparatus may be adjusted to change the locations of the pans having the vacuum and blowing operations applied thereto with respect to the supply launder and the discharge apparatus.

While the term "sand" is used in this specification that term in no way limits the use of the filter, and it is actually used for the removal of water or solutions from a large number of granular or crystalline products which do not require what is known as a "slime filter." The term "vacuum" used herein is also to be accepted not in its absolute sense, but as understood commercially as a pressure more or less below atmospheric pressure up to about 25 inches of mercury.

Other objects of the invention will appear as the description proceeds.

An embodiment of the invention is shown in the drawings in which the same reference numeral is applied to the same portion throughout, but I am aware that there may be modifications thereof.

Figure 2:
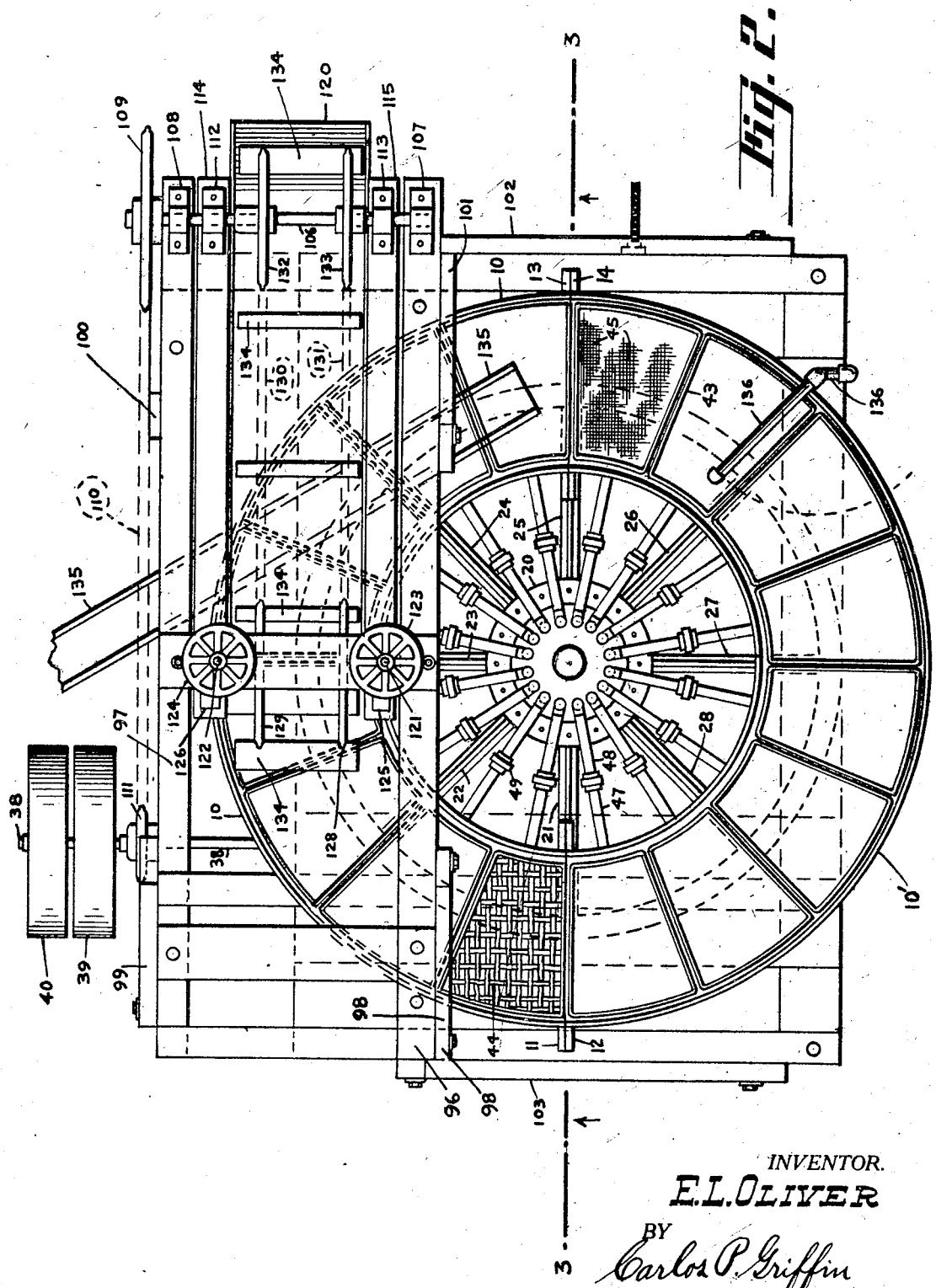
Figure 3:
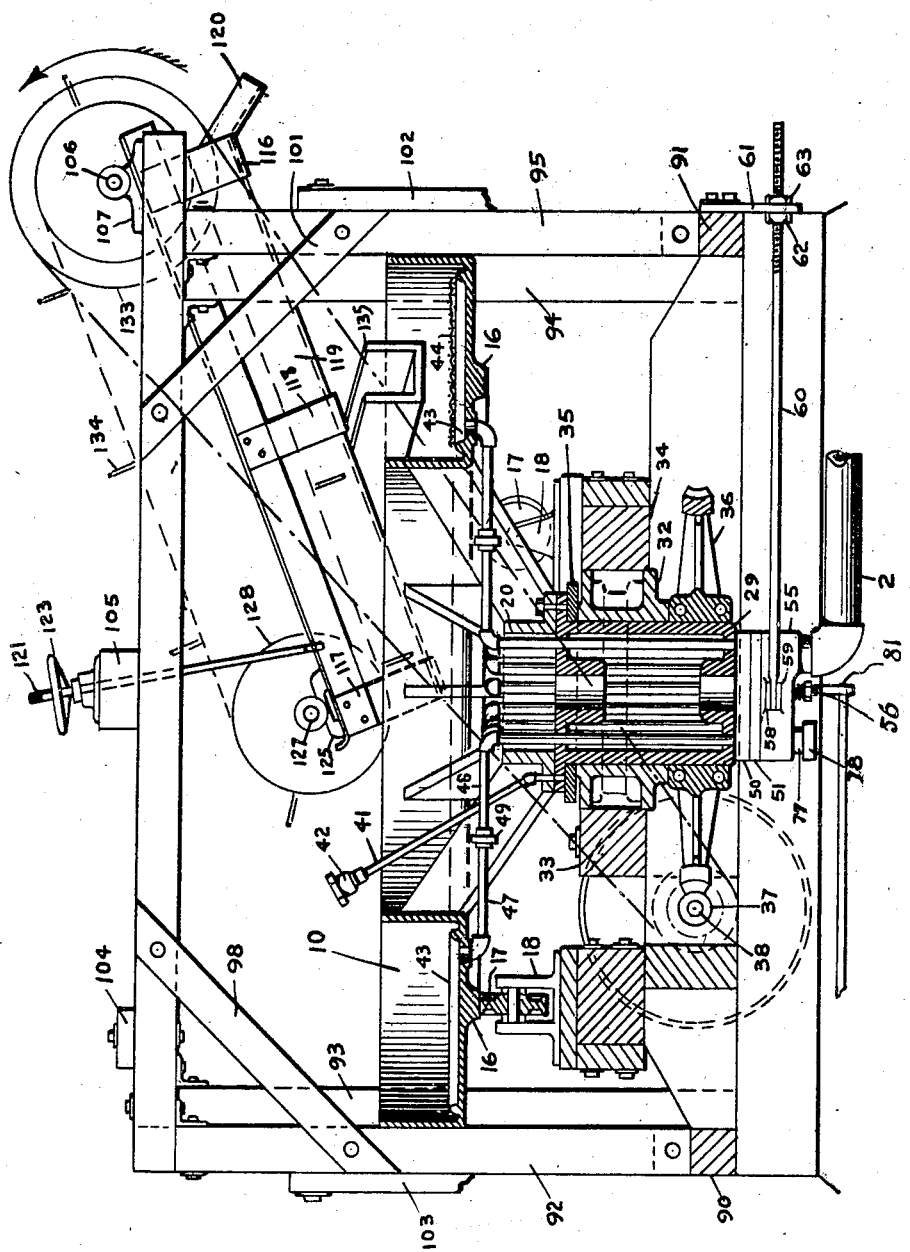

Figure 1 is a drawing partly in section showing one half of the filter and illustrating the operation of the air pump and pump for the filtrate, Fig. 2 is a plan view of the filter upon a larger scale than Fig. 1, the central supporting post being omitted, Fig. 3 is a vertical sectional view of the filter looking in the direction of the arrows on the line 3—3 Fig. 2, the central supporting post being omitted, Fig. 4 is a sectional view of the automatic valve for controlling the vacuum and blowing apparatus, Fig. 5 is a plan view of the lower or adjustable portion of the automatic valve on the plane 5—5 Fig. 4, Fig. 6 is a vertical sectional view of the automatic valve looking in the direction of the arrows and taken on the line 6—6 Fig. 5, and Fig. 7 is a side elevation of one of the plugs used for steam, air or water connections on the cleaning side of the automatic valve, Fig. 8 is an enlarged vertical section through one of the filter pans.

The numeral 1 represents a suitable base upon which the filter is mounted, and from which filter a pipe 2 extends to a receiver 3. This receiver is for the purpose of collecting the filtrate from which a pump 4 driven by a motor or other source of power 5 removes the filtrate, sending it through a suitable pipe 6 to any convenient place of storage.

At the top of the receiver 3 there is a pipe 7 which extends to the vacuum pump 8 so that a suitable vacuum is always maintained in the receiver 3 and consequently under the filter media carried by the pan 10.

In the present instance, the filter pan is shown cast in two parts and connected by means of the flanges 11, 12, 13 and 14, although the number of parts that the pan is cast in is not an essential part of the invention. The half of the pan having the flanges 12 and 14 is indicated by the numeral 10'. Under the pan there is a suitable bearing rail 16 for the support of the pan which rides upon a plurality of rollers 17 carried by suitable bearings 18, there being such a number of these rollers as is necessary to properly support the pan.

The pan is connected with a circular flanged ring 20 by means of eight spokes 21 to 28. Below the ring 20 and bolted to its flange is a large hollow journal 29 which carries a post 30 with rods 31 connected with the table for the additional support thereof. The journal 29 is revoluble in a journal box 32 supported by the cross stringers 33, 34 and it rests upon the wear plate 35. On the lower end of the journal 29 there is a large worm wheel 36 which is rotated by the worm 37 on the shaft 38, the latter carrying the fast and loose pulleys 39, 40 on its outer end.

The flange of the bearing 29 has an oil pipe 41 and oil cup 42 connected therewith to supply the bearing ring 35 and box 32 with lubricant.

The pans 10, 10' have a series of flanges 43 formed therein which flanges form a continuous series of beds each of which is covered with a suitable grid 44 and filter cloth 45, the cloth being wedged under blocks 46 driven between the adjoining flanges 43 and between the flanges and the sides of the filter pan 10.

The several compartments formed by the flanges 43 are each provided with pipes 47 and 48 which are connected together with the unions 49, there being 16 of the pipes and separate pans in the figures illustrated. The pipes 48 all fit into suitable holes in the hollow journal 20 on the lower end of which is secured a plate 50 faced with an antifriction plate 51, the two plates being held in place by means of the bolts 52, 53. Below the plate 51 and supported thereby is the automatic valve plate 55. The valve plate is centered and supported by a bolt 56 which is carried by the plate 51 and the spring 57 holds the valve 55 and plate 51 in close engagement. At the side, the valve 55 has two ears 58, 59 which are connected with the adjusting rod 60, said rod passing through a fixed bracket 61 at the side of the frame and being held in a given adjustment by means of the nuts 62, 63.

The valve plate 55 has three separate chambers 64, 65, 66 formed therein with a partition 67 between the chambers 65 and 66. The chamber 64 has three holes 68, 69, 70 from the top of the plate thereinto, and the chambers 65, 66 have a slot extending thereinto which extends from one side of the chamber 64 around to the other side thereof and which has projecting ledges 72, 73. The ledges 72, 73 are for the purpose of supporting the cut-off blocks 74, 75, the former of which determines the beginning of the vacuum operation and the latter of which by means of its partition 76 determines the time the chambers 65, 66 will respectively draw on the chambers of the filter, or if said block is omitted altogether will permit either one of said chambers to take all the solution from the filter pans. The chamber 65 has the pipe 2 connected therewith, and the chamber 66 has a pipe 77 connected therewith, the latter pipe being at present closed with a cap 78 so that the vacuum pump will draw the filtrate off from the time it first comes on the filter till the pipe coming from a particular pan passes over the partition 76. The pipe 77 may be used to draw off the filtrate at a later stage than the pipe 2 when it is desired to separate it into two products as is sometimes done.

If the block 75 is removed, the vacuum will be effective from the block 74 to the end of the port over chambers 65, 66.

Below the chamber 64 a pipe 79 is threaded into the plate 55, and is at present provided with a cap 80, said pipe being for the purpose of supplying a wash or a blast of air or steam under pressure when desired.

Since it is sometimes necessary to supply air, steam and water to properly clear the filter, there is a hollow threaded plug 81 under each of the holes 68 to 70, said plugs serving either to cut off ingress to either of the holes or to provide means whereby several different pipes may be connected to the valve to give different cleaning effects, the nipple 81' extending to the boiler 81" in order to supply the filter with steam whenever necessary.

Mounted on the base 1 is a suitable frame having sills 90, 91 and posts 92 to 95 which support two stringers 96, 97 which are further connected to the posts by the braces 98 to 101. Other braces 102, 103 connect the posts 92 and 95 with the sills 90, 91. The stringers 96, 97 are connected by two cross pieces 104, 105 and by a shaft 106. The shaft 106 is supported in journal boxes 107, 108, and it has a sprocket wheel 109 thereon which is driven by the chain 110 from the sprocket wheel 111 on the shaft 38.

The shaft 106 also passes through two journal boxes 112, 113 on the two stringers 114, 115. The stringers carry, and are connected by three U-shaped members 116, 117, 118, which support a metal trough 119 having a discharge spout at 120. The trough 119 and the stringers supporting it are supported at one end by the shaft 106 and at the other end by the adjusting rods 121, 122, which rods allow the lower end of the trough to come within about one half an inch of the filter fabric and may be raised therefrom by rotating the hand wheels 123, 124 through which said rods are threaded.

At the lower end of the stringers 114, 115 there are two journal boxes 125, 126, for a shaft 127 which carries two sprocket wheels 128, 129 over which chains 130, 131 pass, said chains also passing over two wheels 132, 133 on the shaft 106, and they are connected by a series of flights 134 which serve to push the sand up the trough 119 as it is pushed thereinto by the rotation of the table 10.

A supply launder 135 discharges the material to be filtered on the table, and a wash water pipe 136 may be used to apply wash water if desired, said pipe being so placed as to be swung over the table or out of use as may be desired.

When the filter is in use, the water and vacuum pumps are continuously operated and the filter is rotated slowly. Pulp is fed thereon from the supply launder, and the times of the application of the vacuum and blowing operations are adjusted by means of the blocks 74, 75, and the position of the three threaded hollow plugs 81.

During the time of application of the vacuum the wash water may be applied from the pipe 136 if desired.

As soon as the given filter section passes over the hole 68, the sand is scraped off into the trough 119 and is carried up said trough by the flights 134.

Having thus described my invention what I claim as new and desire to secure by Letters Patent of the United States is as follows, express reservation being made of permissible modifications.

1. A separation apparatus comprising a revoluble pan with a plurality of compartments, a filter bed in each compartment, means to supply the beds with material to be filtered, conduits leading from each compartment toward each other, a valve plate covering the ends of the conduits, means whereby a vacuum may be applied to different groups of the conduits successively through the valve plate, and means to adjust the position of the valve plate to apply the vacuum to the filter beds nearer to or farther from the supply.

2. A filter comprising a revoluble filter pan having a plurality of compartments, means for supplying the pan with pulp, a scraper under which the pan passes for removing the solids from the filter compartments, conduits extending from the several filter compartments to a central location, a valve plate having several chambers therein and covering the ends of said conduits and connections with said chambers whereby a vacuum may be applied to certain of the conduits, and pressure to certain other conduits, means to adjust the position of said valve plate around the axis of the filter pan, and means to rotate the filter pan.

3. A filter comprising a revoluble filter pan having a plurality of sections, a pulp supply, a discharge scraper in proximity to the surface of the filtering medium for the removal therefrom of the collected material, a plurality of pipes extending from the several filter sections to a central location, a plate covering the ends of said pipes, and having several compartments and connections with the compartments whereby a vacuum may be applied to certain of the pipes and pressure to other pipes, means for rotating said plate through a considerable angle to act on sections of the filter under vacuum or under pressure nearer to or farther from the supply as may be desired, and means to rotate the filter pan.

4. In a filter, an annular revoluble pan having a plurality of filter sections, feed and discharge means therefor, a hollow trunnion at the center of the filter pan, pipes extending from the several filter sections into said hollow trunnion, means to rotate the filter pan, a plate at the bottom of the trunnion having several compartments and covering the ends of the pipes and connections with said compartments whereby a vacuum may be applied to certain of the pipes and pressure to others, means to hold said plate resiliently in engagement with the bottom of the trunnion, and means to adjust the position of said plate.

5. In a filter, an annular filter bed having a plurality of sections, a pulp supply, a discharge scraper, a central trunnion, pipes extending from the several sections of the filter bed into said central trunnion, means to rotate the filter bed, a plate at the bottom of the central trunnion having several compartments therein and having several pipes extending therefrom, removable blocks covering portions of the compartments in said plate to determine the time of application of the vacuum to a given set of pipes extending from the filter sections and means to produce a vacuum in the desired compartments.

6. A filter comprising an annular filter bed having a plurality of sections, a central trunnion therefor, means to rotate the filter bed, a series of pipes extending from the several sections of the filter bed into said central trunnion, a plate covering the discharge ends of the pipes extending into said central trunnion, said plate having a plurality of compartments, a pipe extending from one compartment, an air pump for producing a vacuum in certain of the pipes extending to the filter sections, and means for cutting off certain openings in said plate from connection with the pipes extending to the filter section whereby the effects to be successively produced under the filter media may be varied.

7. In a filter, an annular pan having a plurality of filter sections, means to supply pulp thereto, means to apply a vacuum to certain of the sections, means whereby certain of the filter sections may have pressure applied thereto below the filter medium for cleaning purposes, means to adjust the position of the vacuum and pressure supply apparatus to change the filter sections operated on with respect to the supply, means to rotate the filter pan, and means to continuously remove the materials collected on the filter sections.

8. In a filter, a series of filter sections, an automatic valve for applying a vacuum to the filter sections successively, a receiver for the filtrate, a pump for removing the filtrate from the receiver, and a vacuum pump having a connection with the upper portion of said receiver for maintaining a vacuum in said receiver without allowing the filtrate to pass through the vacuum pump.

9. An apparatus of the class described comprising an annulus carrying a plurality of separate filter sections, means to rotate the annulus, a vacuum pump, pipes connecting the pump and filter sections, means to supply the sections with pulp, an adjustable valve for cutting off the vacuum from certain of the sections, and removable blocks carried by the valve for further adjusting the time of application of the vacuum to the filter sections.

In testimony whereof I have hereunto set my hand this 23rd day of May A. D. 1918.

EDWIN LETTS OLIVER.